US006973361B1

(12) United States Patent
Hammond et al.

(10) Patent No.: US 6,973,361 B1
(45) Date of Patent: Dec. 6, 2005

(54) PROCESS PLANNING FOR DISTRIBUTED MANUFACTURING AND REPAIR

(75) Inventors: Christopher R. Hammond, Schenectady, NY (US); Jeffrey S. Keller, Cincinnati, OH (US); David A. Beach, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/531,818

(22) Filed: Mar. 21, 2000

Related U.S. Application Data

(63) Continuation-in-part of application No. 09/277,460, filed on Mar. 26, 1999, now abandoned.

(51) Int. Cl.$^7$ ............................................. G06F 19/00
(52) U.S. Cl. ..................................... 700/104; 700/105
(58) Field of Search ......... 700/97, 108, 103–106; 702/182–185; 707/1–6, 10; 706/911, 912

(56) References Cited

U.S. PATENT DOCUMENTS

| | | | |
|---|---|---|---|
| 4,404,639 A * | 9/1983 | McGuire et al. ............... 701/35 |
| 5,239,487 A * | 8/1993 | Horejsi et al. ............... 702/184 |
| 5,400,018 A * | 3/1995 | Scholl et al. ............... 340/10.3 |
| 5,523,960 A * | 6/1996 | Jeong ............................. 703/6 |
| 5,546,321 A * | 8/1996 | Chang et al. .................. 716/1 |
| 5,552,995 A * | 9/1996 | Sebastian ..................... 700/97 |
| 5,717,595 A * | 2/1998 | Cherrington et al. ....... 705/400 |
| 5,787,234 A * | 7/1998 | Molloy ......................... 706/46 |
| 5,877,961 A * | 3/1999 | Moore ......................... 700/180 |
| 5,880,959 A * | 3/1999 | Shah et al. ................... 700/97 |
| 6,055,468 A * | 4/2000 | Kaman et al. ................ 701/29 |
| 6,128,542 A * | 10/2000 | Kristoff et al. ............... 700/97 |
| 6,243,614 B1 * | 6/2001 | Anderson .................... 700/108 |
| 6,263,322 B1 * | 7/2001 | Kirkevold et al. .......... 705/400 |
| 6,282,469 B1 * | 8/2001 | Rogers et al. ................ 701/29 |
| 6,285,932 B1 * | 9/2001 | de Bellefeuille et al. ..... 701/33 |
| 6,295,525 B1 * | 9/2001 | Hart et al. .................... 706/46 |

FOREIGN PATENT DOCUMENTS

| EP | 0483035 A2 | 4/1992 |
|---|---|---|
| EP | 0784275 A1 | 7/1997 |

* cited by examiner

*Primary Examiner*—Leo Picard
*Assistant Examiner*—R Jarrett
(74) *Attorney, Agent, or Firm*—Armstrong Teasdale LLP; William Scott Andes

(57) ABSTRACT

The present invention relates to a method for optimizing the performance of a process, especially where the process is performed at several different locations. In one embodiment, one or more experts produce a decision tree for use in determining a recommended sequence of steps for the process. A computer network, such as the World Wide Web, is used to convey a request to a computer that has access to the decision tree for a recommended sequence of steps. The request includes any information that is needed by the decision tree to determine the recommended sequence of steps. In response to the request, the computer uses the information in the request and the decision tree to produce the recommended sequence of steps. The recommended sequence of steps is then directed over the network to the user.

20 Claims, 6 Drawing Sheets

| NODE INDEX | TYPE | DESCRIPTION | CHARACTERISTIC | OPERATOR | VALUE | NEXT NODE |
|---|---|---|---|---|---|---|
| 0 | NOTE | USE FLOOD COOLANT AT ALL TIMES | | | | 999 |
| 4 | NOTE | USE APPROXIMATELY .050 OVERTRAVEL ON DRILL STROKE | FILEBASE | CONTAINS | THRU | 999 |
| 5 | NOTE | CLIMB MILL WHILE MILLING | PROCESS | CONTAINS | CHAMFER | 999 |
| 6 | NOTE | CLIMB MILL WHILE MILLING | PROCESS | CONTAINS | PERIPHERAL | 999 |
| 7 | NOTE | USE ONE SECTION OF CUTTER FLUTE FOR ROUGHING; ANOTHER FOR FINISHING | PROCESS | CONTAINS | CHAMFER | 999 |
| 8 | NOTE | USE ONE SECTION OF CUTTER FLUTE FOR ROUGHING; ANOTHER FOR FINISHING | PROCESS | CONTAINS | PERIPHERAL | 999 |
| 9 | NOTE | REVERSE FLEXHONE SPINDLE DIRECTION 1/2 WAY THRU HOLE PATTERN | PROCESS | CONTAINS | FLEXHONE | 999 |
| 10 | NOTE | ALTERNATE PACK DRILL CYCLE: 1/2 DIA. DEEP; RETRACT FULLY; THEN 1/10 DIA. DEEP; RETRACT FULLY; REPEAT AS REQ'D | PROCESS | CONTAINS | COOLANT FED DRILL | 999 |
| 11 | NOTE | COOLANT PRESSURE OF 200+ PSI RECOMMENDED FOR CF DRILLING | PROCESS | CONTAINS | COOLANT FED DRILL | 999 |
| 14 | NOTE | ALIGN WORKPIECE & SPINDLE ONLY AFTER RUNNING WARMUP ROUTINE FOR THIS APPLICATION | TRUE POSITION TOL. | < | 0.002 | 999 |
| 18 | NOTE | WHEN SHAPED HOLE MILLING; ROUGH W/ USED CUTTER; FINISH WITH NEW CUTTER | FILEBASE | CONTAINS | SHAPED | 999 |
| 19 | NOTE | CONSIDER HYDRAULIC TOOLHOLDERS FOR THIS APPLICATION | TRUE POSITION TOL. | < | 0.002 | 999 |
| 20 | NOTE | ALIGN CUTTER FLUTES W/IN .0002 INCHES BEFORE FINISH PASS | TRUE POSITION TOL. | < | 0.001 | 999 |

| | | |
|---|---|---|
| P11TF12 CLASS ▽ —19 | MATERIAL ▽ —19 | EDGE BREAK TYPE ▽ —19 |
| HOLE DIA. —19 | HOLE LENGTH —19 | NUMBER OF HOLES —19 |
| DIAMETER TOL. —19 | MIN. RAD. —19 | NORMAL ENTRY ▽ —19 |
| TRUE POSITION TOL. —19 | COUNTERBORE DIA. —19 | NORMAL EXIT ▽ —19 |
| COUNTERBORE ? ▽ —19 | | COUNTERBORE DEPTH —19 |

| 14 | | | A | B | C | D | E | F | G | |
|---|---|---|---|---|---|---|---|---|---|---|
| P11TF12 CLASS | 1 | 1 | NONE | | | | | | | |
| MATERIAL | 1 | 2 | INCO | WASPALLOY | R95 | R88 | TITANIUM | A286 | MA-250 | MAR-509 |
| EDGE BREAK TYPE | 1 | 3 | CHAMFER | RADIUS | | | | | | |
| SHAPED HOLE MINOR DIA. | 3 | 1 | | | | | | | | |
| HOLE LENGTH | 3 | 2 | | | | | | | | |
| NUMBER OF HOLES | 3 | 3 | | | | | | | | |
| DIAMETER TOL. | 5 | 1 | | | | | | | | |
| MIN. RAD. | 5 | 2 | | | | | | | | |
| NORMAL ENTRY | 5 | 3 | YES | NO | | | | | | |
| TRUE POSITION TOL. | 7 | 1 | | | | | | | | |
| NORMAL EXIT | 7 | 3 | YES | NO | | | | | | |
| COUNTERBORE ? | 9 | 1 | NO | YES | | | | | | |
| COUNTERBORE DIA. | 9 | 2 | | | | | | | | |
| COUNTERBORE DEPTH | 9 | 3 | | | | | | | | |

FIG. 3

| NODE INDEX | TYPE | DESCRIPTION | CHARACTERISTIC | OPERATOR | VALUE | NEXT NODE |
|---|---|---|---|---|---|---|
| 0 | DECISION | ? | NORMAL ENTRY | = | NO | 1 |
| | | | | | | 4 |
| 1 | DECISION | ? | SHAPED HOLE MINOR DIA. | < | 0.52 | 2 |
| | | | | | | 3 |
| 2 | STEP | ROUGH ENDMILL | | | | 5 |
| 3 | STEP | ENDMILL FLAT: SIZE=.437 | | | | 4 |
| 4 | STEP | ROUGH DRILL: U/SIZE=.012 | | | | 5 |
| 5 | STEP | FINISH PERIPHERAL MILL: U/SIZE=.005 | | | | 6 |
| 6 | DECISION | ? | P11TF12 CLASS | = | D | 7 |
| | | | | | | 8 |
| 7 | STEP | ABRASIVE FLOW POST-FIN: SIZE=.001 MIN | | | | 8 |
| 8 | DECISION | ? | COUNTERBORE ? | = | YES | 9 |
| | | | | | | 10 |
| 9 | STEP | COUNTERBORE | | | | 10 |
| 10 | STEP | CHAMFERMILL TOP AND BOTTOM | | | | 11 |
| 11 | STEP | BENCH EDGEBREAK: SIZE=320 GRIT B FLY | | | | 999 |

FIG. 5

| NODE INDEX | TYPE | DESCRIPTION | CHARACTERISTIC | OPERATOR | VALUE | NEXT NODE |
|---|---|---|---|---|---|---|
| 0 | NOTE | USE FLOOD COOLANT AT ALL TIMES | | | | 999 |
| 4 | NOTE | USE APPROXIMATELY .050 OVERTRAVEL ON DRILL STROKE | FILEBASE | CONTAINS | THRU | 999 |
| 5 | NOTE | CLIMB MILL WHILE MILLING | PROCESS | CONTAINS | CHAMFER | 999 |
| 6 | NOTE | CLIMB MILL WHILE MILLING | PROCESS | CONTAINS | PERIPHERAL | 999 |
| 7 | NOTE | USE ONE SECTION OF CUTTER FLUTE FOR ROUGHING; ANOTHER FOR FINISHING | PROCESS | CONTAINS | CHAMFER | 999 |
| 8 | NOTE | USE ONE SECTION OF CUTTER FLUTE FOR ROUGHING; ANOTHER FOR FINISHING | PROCESS | CONTAINS | PERIPHERAL | 999 |
| 9 | NOTE | REVERSE FLEXHONE SPINDLE DIRECTION 1/2 WAY THRU HOLE PATTERN | PROCESS | CONTAINS | FLEXHONE | 999 |
| 10 | NOTE | ALTERNATE PACK DRILL CYCLE: 1/2 DIA. DEEP; RETRACT FULLY; THEN 1/10 DIA. DEEP; RETRACT FULLY; REPEAT AS REQ'D | PROCESS | CONTAINS | COOLANT FED DRILL | 999 |
| 11 | NOTE | COOLANT PRESSURE OF 200+ PSI RECOMMENDED FOR CF DRILLING | PROCESS | CONTAINS | COOLANT FED DRILL | 999 |
| 14 | NOTE | ALIGN WORKPIECE & SPINDLE ONLY AFTER RUNNING WARMUP ROUTINE FOR THIS APPLICATION | TRUE POSITION TOL. | < | 0.002 | 999 |
| 18 | NOTE | WHEN SHAPED HOLE MILLING; ROUGH W/ USED CUTTER; FINISH WITH NEW CUTTER | FILEBASE | CONTAINS | SHAPED | 999 |
| 19 | NOTE | CONSIDER HYDRAULIC TOOLHOLDERS FOR THIS APPLICATION | TRUE POSITION TOL. | < | 0.002 | 999 |
| 20 | NOTE | ALIGN CUTTER FLUTES W/IN .0002 INCHES BEFORE FINISH PASS | TRUE POSITION TOL. | < | 0.001 | 999 |

PROCESS PLANNING FOR DISTRIBUTED MANUFACTURING AND REPAIR

CROSS REFERENCE TO RELATED APPLICATIONS

This application is a continuation-in-part of application Ser. No. 09/277,460, filed Mar. 26, 1999 now abandoned.

BACKGROUND OF THE INVENTION

The present invention relates to the planning of various processes and, in particular, to the planning of manufacturing and/or repair processes conducted at a number of different sites.

A product is typically comprised of a number of pieces. However, a product can be just a single piece. In either case, the piece or pieces of a product have features. For instance, among the features of a circular flange there may be a number of holes that are used to attach the flange to a shaft.

The manufacture of a product begins with the preparation of one or more engineering drawings for each piece of the product. Typically, the drawings are prepared by a design engineer. The drawings set forth the features of the piece and the material to be used in producing the piece. For instance, the engineering drawings for the flange of a jet engine would specify the diameter, depth, edgebreak requirements and number of holes to drill in a specific type of material from which the flange is to be made. The engineering drawings are typically provided to a process planner, who determines the sequence in which the features of a piece are to be made. This sequence is hereinafter referred to as the piece production sequence. To continue with the flange example, the engineering drawings provided to the process planner may specify: (1) that the flange is to be constructed of titanium that is of a specific thickness; (2) five holes are to be drilled around a bolt circle of four inches; (3) the holes are to be one inch deep; and (4) the holes are to be 0.5 inches in diameter±0.001 inches. Since it is normally easier to drill holes in stock that are rectangular in shape rather than circular in shape, the process planner is likely to specify a piece production sequence that calls for the holes to be drilled before the titanium stock is given a circular shape. Once the piece production sequence has been completed, the engineering drawings and piece production sequence are provided to the manufacturing engineer, who is responsible for producing the piece. While the engineering drawings and piece production sequence provide a substantial amount of information to the manufacturing engineer, they do not specify how any particular feature is to be produced. Consequently, the manufacturing engineer is left to determine the sequence of operations to be used in producing each feature of the piece. This sequence of operations is hereinafter referred to as the feature process sequence. To continue with the flange example, because of the close tolerance of ±0.001 inches, the manufacturing engineer might initially drill each of the holes with a slightly smaller diameter drill than 0.5 inches, then use a 0.5 inch reamer and finish with a deburring operation to remove any sharp edges.

In many industries, it is common to attempt to repair worn or damaged parts as an economical alternative to simply replacing such parts. The development of repair processes is similar to the development of manufacturing processes in that one or more engineers determine a sequence of operations to be used in the repair of a particular part. This sequence of operations is herein referred to as the repair process sequence.

In many situations, the manufacture of a product, a piece of a product, or a feature that is common to two or more products is performed at two or more locations. There are a number of possible reasons that a company opts for distributing the manufacturing of its products. For instance, a company may produce a product or piece of a product at two or more sites so as to have a facility that is capable of maintaining at least a portion of the overall production if production at one of the sites is interrupted or severely curtailed. Other possible reasons include the availability of skilled workers in one area relative to another and the availability/cost of the raw materials at one location relative to another. In any event, the manufacture of a product, piece of a product, or feature common to two or more products at two or more sites presently requires that the manufacturing engineer at each site generate a feature process sequence. For similar reasons, it is not uncommon to provide repair services at numerous locations. In this case, it would be typical that a repair process sequence for the repair of a particular part would be generated at each site performing that repair.

BRIEF SUMMARY OF THE INVENTION

The present invention recognizes that the current approaches to manufacturing and repair are inefficient, and that this inefficiency is particularly evident when two or more sites are used to manufacture a product or a portion of a product, or to repair a part. To elaborate, it has been found that with the current approaches, a feature process sequence designed by a manufacturing engineer at one site is, in many cases, inefficient from at least one perspective. For instance, the feature process sequence may turn out fewer parts over time than an alternative sequence. The sequence may also be more expensive from the perspective of the amount and/or type of perishable tooling required to produce the feature. Other inefficiencies may also be present.

Whether or not such inefficiencies exist at a particular manufacturing site, it has generally been found that inefficiencies are present when multiple manufacturing sites are involved in the manufacturing of a particular feature. This is because in most cases a different manufacturing engineer is designing the feature process sequence at each site. As a consequence, the feature process sequences generally vary from site to site. This variation typically results in inefficiencies, such as the previously noted inefficiencies with respect to output per unit time and perishable tooling, at one or more of the manufacturing sites. The current manufacturing approach is also inefficient from the perspective of the time spent by different manufacturing engineers at multiple sites designing feature process sequences for the same feature. Similar inefficiencies arise under the current repair approach when multiple repair facilities are involved in the repair of a particular part.

The present invention provides a method for addressing the inefficiencies in the current approaches and particularly in the situation where the manufacturing of a feature or the repair of a part occurs at multiple sites. The present invention makes use of a computer network (e.g., LAN, WAN or the World Wide Web) to convey recommended process sequences to the sites that are manufacturing a product or repairing a part. This assures uniform distribution of a recommended process sequence for the particular task. In one embodiment, the recommended process sequence is provided by a decision tree that is designed by manufacturing or repair experts and includes: (1) one or more questions that each require an answer; and (2) steps. In operation, the answers to the questions are used to determine which steps become part of a recommended process sequence. For example, if the feature of interest is a hole, there may be two different recommended sequences of steps to take in forming the hole depending on the diameter of the hole. This would be recognized in the decision tree by a question asking for the diameter of the hole that is to be produced and depending on the answer, providing one of two possible steps or sequence of steps for inclusion in the recommended process sequence. Both the questions and the steps embodied in a decision tree reflect the efficiencies that are of concern to the experts designing the decision tree. For example, the experts may be concerned about output per unit time, perishable tooling, quality of the resulting feature and the like. Moreover, the efficiencies that the experts are concerned about may be weighted. For instance, output per unit time may be weighted more heavily than perishable tooling. If so, the decision tree will reflect a preference for increasing output over concerns about reducing the use of perishable tooling. Even in the absence of any weighting, it is not uncommon for the various efficiency goals to conflict with another, thereby requiring the experts to make judgments concerning the design of the decision tree. Due to the conflicting goals, the design of the decision tree is typically determined by heuristic methods. Moreover, the design of the decision tree is subject to change if the efficiencies of concern or the weight accorded a particular efficiency concern changes.

The method of the present invention involves conveying a request from a manufacturing or repair site for a recommended process sequence for a particular feature or repair over a computer network. Once the request is received by a computer that has access to the decision tree, the request is processed to identify the recommended process sequence for producing the feature or repairing the part. Subsequently, the recommended process sequence is transmitted over the computer network for receipt at the requesting site. By extending the network to several sites, uniform distribution of recommended process sequences for manufacturing features or repairing parts is obtained and efficiencies realized.

BRIEF DESCRIPTION OF THE DRAWINGS

FIG. 2 graphically illustrates one embodiment of a user interface or input screen for soliciting information from a user to form a request for a recommended process sequence;

FIG. 3 is a spreadsheet implementation of an input form for generating an input screen;

FIG. 5 is a spreadsheet implementation of a decision tree used in providing a recommended process sequence; and FIG. 6 is a spreadsheet implementation of "expert notes" used to supplement a recommended process sequence.

DETAILED DESCRIPTION OF THE INVENTION

Figure 1:
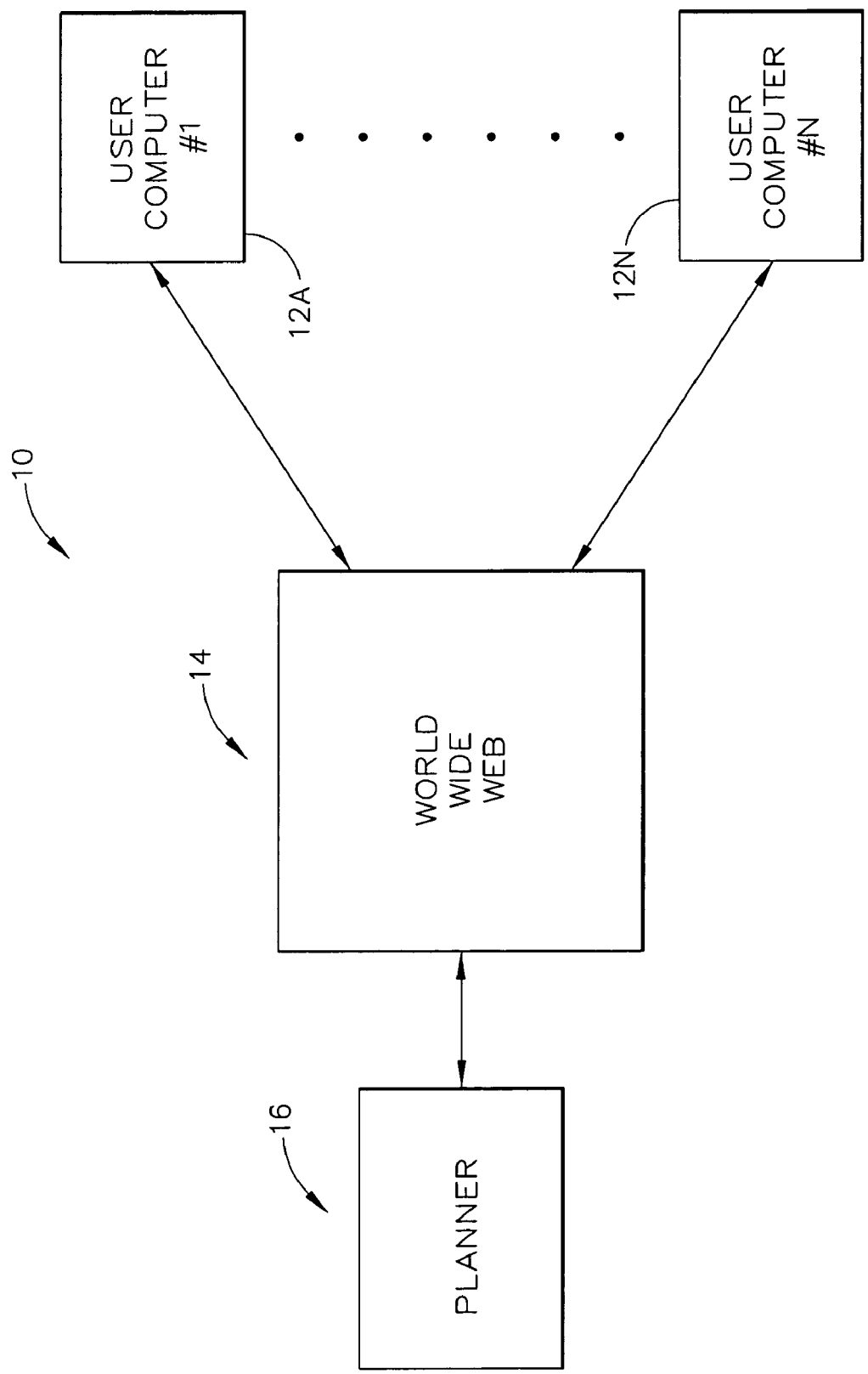
FIG. 1 is a schematic diagram of a distributed processing system that embodies the present invention.

FIG. 1 illustrates a distributed processing system 10 that is capable of uniform distribution of recommended process sequences to a number of manufacturing sites, where two or more sites are either manufacturing the same product, piece of a product, or a feature common to two or more products, or to a number of repair sites where common repairs are made. The system 10 includes: (1) one or more user computers 12A–12N that are each capable of transmitting requests for recommended process sequences over a digital communication network and receiving the recommended process sequences subsequently conveyed over the network in reply to the request; (2) a digital communication network 14 for conveying the requests and the recommended process sequences; and (3) a planner 16 that, in response to a request, provides a recommended process sequence for conveyance over the network 14 to the requesting user computer.

The network 14 can include any kind of digital communication network or combination of digital communication networks. For example, the network can include a local area network (LAN), wide area network (WAN), World Wide Web or any combination of these networks. Likewise, the user computers 12A–12N and planner 16 can be of any form so long as the requests and recommended process sequences can be communicated between the user computers 12A–12N and the planner 16. In the illustrated embodiment, the network 14 includes the World Wide Web. Consequently, the user computers 12A–12N each utilize a web browser to send a request and receive a recommended process sequence. The planner 16 is also implemented in the form of a web server.

The planner 16 provides each of the user computers 12A–12N with an interface that permits the user to convey requests for a recommended process sequence and receive the recommended process sequence. The interface includes an input portion and an output portion. The input portion of the interface is used to convey information from the user's computer to the planner 16. The output portion conveys information from the planner 16 to the user computer and is typically displayed on the monitor of the user's computer. However, the output portion is capable of being displayed on other output peripherals, like printers. Typically, the input information is generated by the user's actuation of an input peripheral, such as a mouse or a keyboard. In the illustrated embodiment, the interface is provided by web pages that are transmitted by the planner 16 to each of the user computers 12A–12N. A web page includes input and/or output portions. The input portion of a web page allows the user to enter information relevant to a request for a recommended process sequence with an input peripheral, such as a mouse or keyboard. The output portion of a web page is used to provide the user with the recommended process sequence. In addition the output portion of a web page is used to solicit information relevant to a request for a recommended process sequence from a user. In this case, the web page includes both input and output portions.

In assembling a request for a recommended feature process sequence, the interface is initially used to solicit input from the user concerning the identification of the feature for which a recommended process sequence is desired. In the case of a request for, a recommended repair process sequence, the interface is initially used to solicit input from the user concerning the repair for which a recommended repair process sequence is desired. In the illustrated embodiment, a web page is conveyed from the planner 16 to the user's computer that includes a hierarchical menu that allows the user to identify the type of process for which the user wants to request a recommended process sequence. Preferably, the highest level of the menu has the general types of manufacturing and repair processes for which recommended process sequences are to be generated. These could include, but are not limited to, manufacturing and repair processes such as hole making, welding, brazing, cleaning, part marking, composite laminating, adhesive bonding, grinding, thermal spray coating, diffusion coating, plating, etching, assembly, broaching, forging, forming, thread forming, tube bending, balancing, polishing, inspection (e.g., general, X-ray, eddy current, ultrasonic and penetrant inspection), laser drilling and cutting, electrical discharge machining, electro chemical machining, electro stream drilling, packaging, molding, gear shaping or forming, peening, blasting, riveting, soldering, casting, milling, turning and heat treat. Various other processes could be included as well. Indeed, the present invention is not necessarily limited to manufacturing and repair processes, but could be applicable to any sort of process that is performed at multiple sites.

Under each top level menu item is a sub-menu that is used to identify the different types of features or repairs applicable to that top level menu item. For instance, under the hole making function, sub-menus for different features such as through-round hole and blind-round hole would reside. Likewise, under the welding function, there is a sub-menu that specifies different types of welding features, like a fillet and butt-joint, and so on for the other functions. Alternatively, it is possible that a sub-menu of different sub-processes could reside under one or more of the top level menu items. For example, under the welding function, there could be a sub-menu that specifies specific types of welding processes such as TIG, EB and resistance welding.

In most cases, the identification of a feature or repair does not provide sufficient data for a recommended process sequence to be specified. Consequently, the interface is used to solicit information from the user concerning the selected feature or repair. For instance, with respect to a hole feature, the user may specify the material in which the hole is to be drilled, the diameter of the hole, the depth of the hole and whether or not the hole is to be counter bored.

In the illustrated embodiment, the planner 16 provides a user's computer with an input form that causes a dynamically written input screen to be displayed on the user's monitor or other output peripheral. The input screen allows the user to both select inputs from a menu of items already contained in the input form and to input information. FIG. 2 is an example of an input screen 18 for use in obtaining a recommended feature process sequence for the manufacture of a hole. The input screen 18 includes a number of input windows 19 that allow the user to input the relevant information about the hole. As shown in FIG. 2, input windows are included to solicit hole parameters such as the P11TF12 class (which describes the significance of the hole to the life of the part in which it is being formed), the material in which the hole is to be made, the edge break type, the hole diameter and length, the number of holes to be made per part, the diameter tolerance, the minimum radius, whether the hole is to be made with a normal entry, the true position tolerance, whether the hole is to be made with a normal exit, whether the hole has a counterbore, and, if so, the counterbore diameter and depth. Some of the input windows, such as those for the class, material and edge break type, have pull-down menus that provide a list of possible inputs for the user to select. Other input windows, such as the normal entry, normal exit and counterbore windows, have pull-down menus from which the user can select a yes or no answer. The remaining input windows simply allow the user to input an appropriate numerical value. Thus, by way of example, the user is permitted to: (1) select one of a number of materials in which the hole is to be drilled; (2) input a yes/no answer to a counterbore query; and (3) input a value for the length of the hole. The input screen would be configured for different parameters when dealing with processes other than hole making.

The input form that causes the input screen to be generated is preferably in a spreadsheet format, as shown in FIG. 3. The input form includes an input parameter column 20 that identifies each parameter, corresponding to a respective one of the input windows 19, for which input is being solicited from the user. Two positioning columns 21 are provided for controlling the relative positions of the input windows 19 on the input screen 18. Also included in the spreadsheet are one or more input value columns 22 that dictate whether the corresponding input window will: (a) provide the user with a number of selections for a parameter; (b) solicit a yes/no entry from the user for a parameter; or (c) solicit a numerical value for a parameter from the user. For instance, the input value columns 22 corresponding to the material parameter are filled with the types of materials the user could select from the pull-down menu associated with that input window. Similarly, the input value columns 22 corresponding to the normal entry parameter have yes and no entries, allowing the user to select a yes or no input. The input windows corresponding to parameters for which the input value columns 22 are vacant will not have a pull-down menu; the user enters a numerical value in these input windows. While other types of formats are possible for obtaining the information needed for the request, the spreadsheet format is a format that is readily understood by the users, even if they have had no prior experience with this format.

Figure 4:
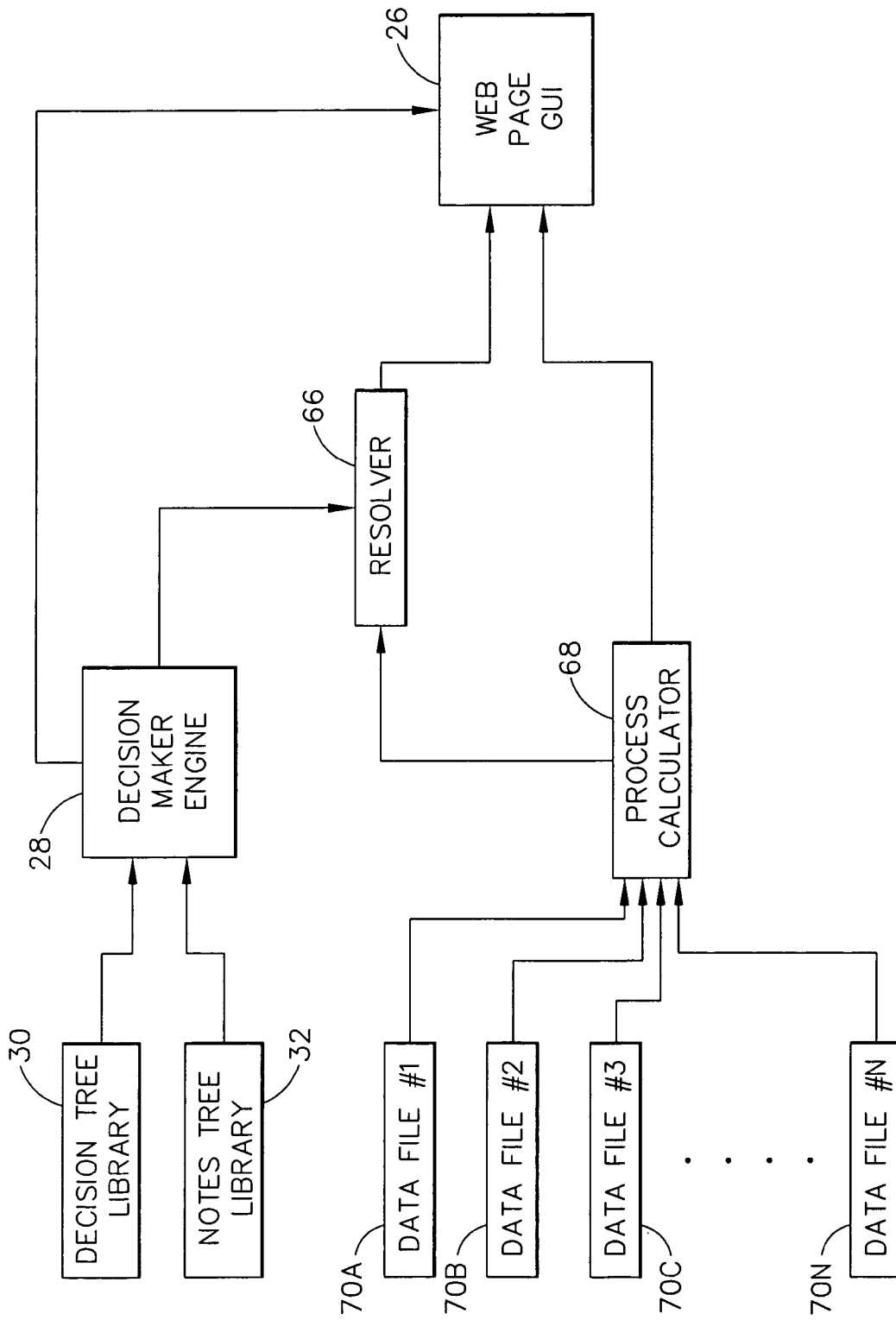
FIG. 4 is an architectural diagram of an embodiment of a computer system that receives requests for a recommended process sequence from a user's site and provides a recommended process sequence in response thereto.

The planner 16 is capable of receiving a request for a recommended process sequence and responding to the request with a recommended process sequence. In the illustrated embodiment as shown in FIG. 4, the planner includes a web page/graphical user interface ("GUI") 26 for receiving a request from the network 14 for a recommended process sequence and transmitting a recommended process sequence to the network 14 that is directed to the requesting user's computer. Also part of the planner 16 is a decision maker engine 28 that, in response to a request conveyed by the GUI or other network interface, assembles a recommended process sequence. The decision maker engine 28 uses a decision tree library 30 to provide a recommended process sequence. Additionally, a notes decision tree library 32 is used by the decision maker engine 28 to obtain error proofing and best practice information.

The decision tree library 30 is comprised of a decision tree for each feature or repair. For instance, and by way of example, there may be a decision tree for hole making, welding, brazing, cleaning, part marking, composite laminating, adhesive bonding, grinding, thermal spray coating, diffusion coating, plating, etching, assembly, broaching, forging, forming, thread forming, tube bending, balancing, polishing, inspection (e.g., general, X-ray, eddy current, ultrasonic and penetrant inspection), laser drilling and cutting, electrical discharge machining, electro chemical machining, electro stream drilling, packaging, molding, gear shaping or forming, peening, blasting, riveting, soldering, casting, milling, turning and heat treat. A decision tree sets forth the decisions that must be made to determine which of a number of possible steps that may be applicable to a process become part of a recommended process sequence. The construction of a decision tree is done by one or more experts that define the decisions that must be made, the sequence of decisions, and the steps associated with each decision. Typically, this construction process is based upon several efficiency related considerations. For example, the experts may be concerned about the output per unit time, perishable tooling, quality of the resulting feature and the like. Moreover, the efficiencies that the experts are concerned about may be weighted. For instance, output per unit of time may be weighted more heavily than perishable tooling. If so, the resulting decision tree will embody a preference for increasing output over concerns about reducing the use of perishable tooling. Even if one type of efficiency is not weighted over another, the various efficiency considerations may compete against one another, thereby requiring the experts to make choices in the design of a decision tree that do not necessarily serve one or more of the identified efficiency considerations. Based on the foregoing, the design of a decision tree is typically determined by heuristic methods and is subject to change based upon changes in the efficiencies that are of concerned and/or the weights accorded the efficiencies of concern.

A decision tree can be comprised entirely of steps. However, the typical decision tree includes at least one decision node that, based upon a decision, is used to determine whether or not a step or sequence of steps are to become part of the recommended process sequence that is transmitted in response to a user's request. The decision for each decision node is embodied in the request. For instance, a request for a recommended process sequence for a hole might include a decision as to whether the hole is to be counter bored. When the decision maker engine 28 traverses the decision tree, a decision node is encountered that requests a decision as to whether or not the hole is to be counter bored. If the request indicates that the hole is to be counter bored, the decision maker engine 28 includes steps relating to counter boring in the recommended process sequence. If the hole is not to be counter bored, the decision maker engine 28 skips the steps relating to counter boring in the decision tree and continues traversing the decision tree at a point after the counter boring steps.

The decision trees in the library 30 are implemented in spreadsheet format to facilitate the construction and alteration of the decision tree by the experts. FIG. 5 is an example of a decision tree spreadsheet for creating a hole. The spreadsheet includes: (1) a node index column 36; (2) a type column 38 that for each node, identifies the node as either a step node or a decision node; (3) a description column 40 that provides either: (a) a description of the step associated with a step node, which in some cases includes data that is necessary for calculation; or (b) a simple question mark identifier for each decision node; (4) a characteristic column 42 that for each decision node, identifies the parameter for which there should be a value in the input form; (5) a value column 44 that for each decision node, includes a decision value; (6) an operator column 46 that for each decision node, contains an operator that defines the manner in which the value of the parameter identified in the characteristic column is to be compared to the decision value in the value column; and (7) a next node column 48 that for each decision node, identifies the next node in the tree that is to be traversed if the comparison of the input value to the decision value is true or if the comparison is false.

The decision maker engine 28 traverses a decision tree beginning at node 0 and proceeding through the tree until the final node of the tree is encountered. In FIG. 5, the final node is identified as node 999. At each node of the tree either a decision node is encountered or a step node. The decision nodes are used to determine which of the steps set forth in the decision tree are used to construct the recommended process sequence. If a decision node is encountered, the value for the parameter identified in the characteristic column and obtained from the input form is compared to the decision value according to the defined operator. If the comparison is true, the decision maker engine continues traversing the tree at the first node identified in the next node column 48. If the comparison is false, the decision maker engine continues traversing the tree at the second node identified in the next node column 48. Whenever the decision maker engine 28 encounters a step node, the step set forth in the description column of the step node is added to the recommended process sequence. As an example of the whether or not a step is added to the recommended process sequence, the step in the description column of node 2 in FIG. 5 is added to the recommended process sequence if the value of the shaped hole minor diameter parameter is less than 0.52 inches. If the value of the shaped minor hole minor diameter parameter is equal to or greater than 0.52 inches, the step in the description column of node 2 is not added to the recommended process sequence.

The decision maker engine 28 also accesses the notes decision tree library 32 that is comprised of a notes decision tree for each basic decision tree. A notes decision tree sets forth the known error proofing techniques and best practices to follow in creating the feature or making a repair. Like a basic decision tree, a notes decision tree is assembled by experts that define the error proofing and best practices to follow in creating the feature or making the repair. The notes decision tree may also reflect the efficiencies that are of concern.

A notes decision tree includes a plurality of "note" nodes that each correspond to a step node in the basic decision tree and provide a note that relates to the step set forth in the step node. In operation, if a step from the basic decision tree is added to the recommended process sequence, the corresponding note from the note decision tree is considered for inclusion in the recommended process sequence. Whether or not a note is included in the recommended process sequence may depend on the answer to a query. The answer to the query is present in either the recommended process sequence or the input form.

The notes decision trees in the library are implemented in spreadsheet format. FIG. 6 is an example of a notes decision tree for use in drilling a hole. The spreadsheet includes: (1) a node index column 50; (2) a type column 52 that identifies each of the nodes in the tree as a "note" node; (3) a description column 54 that sets forth the error proofing and/or best practice to use in executing a particular step in the recommended process sequence being built from the decision tree; (4) a characteristic column 56 that for each note node, identifies the parameter for which there should be a value in the recommended process sequence or input form; (5) a value column 58 that for each note node, includes a decision value; (6) an operator column 60 that for each note node, contains an operator that defines the manner in which the value of the parameter identified in the characteristic column is to be compared to the decision value in the value column; and (7) a next node column 62 that for each note node identifies the next node in the tree that is to be traversed if the comparison of the input value to the decision value is true and if the comparison is false. As an example of the whether or not a note is added to the recommended process sequence, the note in the description column of node 5 in FIG. 6 is added to the recommended process sequence if the process, which is either the recommended process sequence or the input form, contains the word chamfer. As an alternative to separate notes decision trees, the contents of the notes decision trees could be incorporated into the corresponding basic decision trees.

Also part of the planner 16 is a resolver 66 that receives the recommended process sequence output by the decision maker engine 28, identifies situations in which information is needed to complete the recommended process sequence, acts to obtain the information, and outputs the completed sequence to the GUI 26. The resolver 66 identifies the need for further information by looking for keywords in the steps and notes contained in the recommended process sequence that indicate further information is needed. Any information that is needed to complete the sequence relates to process specific information that cannot be readily resolved with a decision tree. If the resolver 66 identifies the need for further information to complete the recommended process sequence, a process calculator 68 is used to obtain the needed information. The process calculator 68 has access, if needed, to one or more databases 70A–70N that provide information that is used in conjunction with information contained in a step to provide the necessary information. For instance, if the recommended process sequence relates to the drilling of a hole, the resolver 66 may call on the process calculator 68 to provide information with respect to which drill to use, the speed at which the drilling should be done and the coolant to be used during the drilling process. Once all of the information needed to complete the recommended process sequence has been obtained from the calculator 68, the recommended process sequence is provided to the GUI 26. In response, the GUI 26 provides the recommended process sequence to the network 14 for conveying to the requesting user's computer. The recommended process sequence is also in the form of a spreadsheet that lists the recommended steps for producing the feature or repair specified by the user and if appropriate, the error proofing and/or best practices associated with each step.

It is also feasible to integrate the planner 16 into each of the user computers 12A–12N to create a stand-alone system. In this case, it is feasible to use the network 14 to update the planner 16 resident in each of the computers 12A–12N. The stand-alone system is particularly useful in situations where the integrity or ability to use the network 14 is unreliable. It is also feasible to download the planner 16 to the user computer each time a recommended process sequence is requested from the planner 16.

The foregoing description of the invention has been presented for purposes of illustration and description. Further, the description is not intended to limit the invention to the form disclosed herein. Consequently, variations and modifications commensurate with the above teachings, and the skill or knowledge in the relevant art are within the scope of the present invention. The preferred embodiment described hereinabove is further intended to explain the best mode known of practicing the invention and to enable others skilled in the art to utilize the invention in various embodiments and with the various modifications required by their particular applications or uses of the invention. It is intended that the appended claims be construed to include alternate embodiments to the extent permitted by the prior art.

What is claimed is:

1. A method for distributing information concerning recommended steps for repairing a part, comprising:
    using a computer network to receive at a first location a request for a recommended repair sequence of steps for repairing the part, the request originating at a second location that is remote from the first location;
    causing an input screen to be displayed at the second location to collect information about the recommended repair sequence of steps for repairing the part;
    processing, at the first location, the request to produce the recommended repair sequence of steps for repairing the part;
    determining the recommended repair sequence of steps and providing error proofing directions; and
    using the computer network to convey from the first location to the second location a response that includes the recommended repair sequence of steps for repairing the part and error proofing directions based on the recommended repair sequence of steps included in the response.

2. The method as claimed in claim 1, wherein:
said processing includes using a decision tree for use in determining the recommended repair sequence of steps.

3. The method as claimed in claim 2, wherein:
the decision tree includes a decision node, said method further comprises determining if a first sequence of steps or a second sequence of steps is part of the recommended repair sequence of steps based on the decision node.

4. The method as claimed in claim 1, wherein:
said processing includes using a notes tree for providing error proofing directions for the recommended repair sequence of steps in the response.

5. The method as claimed in claim 1, wherein:
said processing includes using a notes tree for providing best practices directions for the recommended repair sequence of steps in the response.

6. The method as claimed in claim 1, wherein:
said processing includes using a tree structure that is in the form a spreadsheet.

7. The method as claimed in claim 1, wherein:
said processing includes calculating a value associated with a step of the recommended repair sequence of steps.

8. The method as claimed in claim 7, wherein:
said calculating includes using a data file.

9. The method as claimed in claim 7, wherein:
said calculating includes using a data file that is in the form of a spreadsheet.

10. A method for distributing information concerning recommended steps for repairing a part, comprising:
    providing a computer network for communicating digital data between at least two locations;
    first conveying, using the computer network, a request for a recommended repair sequence of steps for repairing the part, the request having originated at a first location and being directed to a second location; and
    second conveying, in response to the request and using the computer network, a response that includes the recommended repair sequence of steps for repairing the part and error proofing directions based on the recommended repair sequence of steps included in the response, the response having originated at the second location and being directed to the first location.

11. The method as claimed in claim 10, wherein:
providing a computer network further comprises providing a network that includes the World Wide Web.

12. The method as claimed in claim 10, wherein:
said providing includes providing one of the following: a local area network and a wide area network.

13. The method as claimed in claim 10, wherein:
said first conveying includes conveying the request in the form of a spreadsheet.

14. The method as claimed in claim 10, wherein:
said second conveying includes conveying the response in the form of a spreadsheet.

15. The method as claimed in claim 10, wherein:
said second conveying includes conveying the recommended repair sequence of steps in the form of a spreadsheet.

16. A method for providing information concerning recommended steps for repairing a part, comprising the steps of:
providing, in a computer memory, a decision tree having at least two possible sequences of steps for repairing a part and error proofing directions based on the sequences of steps;
receiving a request, originating from a computer input device, for a recommended repair sequence of steps for repairing the part, the request including information for use in determining a recommended repair sequence of steps from the at least two possible sequences in the decision tree;
using, in a digital computer, the decision tree to determine a recommended repair sequence of steps for repairing the part and error proofing directions based on the recommended repair sequence of steps; and
transmitting the recommended repair sequence of steps and the error proofing directions towards a computer output device.

17. The method as claimed in claim 16, further comprising:
permitting an expert to modify the decision tree.

18. The method as claimed in claim 16, further comprising:
receiving the decision tree from a remote location relative to the digital computer.

19. The method as claimed in claim 16, wherein:
said step of receiving includes conveying the request over a computer network.

20. The method as claimed in claim 16, wherein:
said step of transmitting includes conveying the recommended repair sequence of steps over a computer network.

\* \* \* \* \*